US006868081B1

(12) United States Patent
Akram et al.

(10) Patent No.: US 6,868,081 B1
(45) Date of Patent: Mar. 15, 2005

(54) METHOD AND APPARATUS FOR SIMULTANEOUS MULTILINE PHONE AND DATA SERVICES OVER A SINGLE ACCESS FACILITY

(75) Inventors: Abdul Ghafoor Akram, Grandview, MO (US); Stanley Chum, Fremont, CA (US); Frank Anthony DeNap, Millbrae, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/290,855

(22) Filed: Apr. 13, 1999

(51) Int. Cl.$^7$ .............................. H04L 12/56; H04J 3/16; H04J 3/22; H04M 1/60; H04M 9/00

(52) U.S. Cl. ...................... 370/356; 370/352; 370/389; 370/468; 379/173; 379/229

(58) Field of Search .............................. 370/352, 356, 370/468, 471, 503, 537, 455, 355, 389, 353, 458, 466; 379/164, 165, 171, 173, 225, 229

(56) References Cited

U.S. PATENT DOCUMENTS

| 4,547,880 A | * | 10/1985 | De Vita et al. ............. 370/351 |
| 5,124,978 A | * | 6/1992 | Chao ........................... 370/422 |
| 5,214,692 A | * | 5/1993 | Chack et al. ............... 379/265 |
| 5,263,063 A | * | 11/1993 | Sappey ........................ 379/164 |
| 5,506,844 A | * | 4/1996 | Rao ............................. 370/468 |
| 5,682,386 A | * | 10/1997 | Arimilli et al. ............. 370/468 |

(List continued on next page.)

OTHER PUBLICATIONS

ITU–T Telecommunication Standard G 723.I Annex A (11/96), "Series G: Transmission Systems and Media," Annex A: Silence compression scheme, (Sep. 11, 1996).
Telecommunication Standardization Sector of ITU, "Coding of Speech at 8 kbit/s Using Conjugate–Structure Algebraic–Code–Excited Linear–Prediction (CS–ACELP): ITU–T Recommendation G.729", General Aspects of Digital Transmission Systems, International Telecommunication Union (ITU), (Mar. 1996).

(List continued on next page.)

Primary Examiner—Man U. Phan (57) ABSTRACT

According to the invention, a method and apparatus are disclosed for providing multiline telephonic and data services over a single access facility. In one embodiment of the present invention, a wall unit is located at a customer premises which terminates a single analog phone line and adaptively encodes using Voice over Internet Protocol technology and multiplexes a plurality of telephonic and data calls over the single analog phone line. A corresponding gateway server (or a plurality of gateway servers), which supports one or a plurality of wall unit calls, is located in the public switched telephone network ("PSTN"), or possibly in a private telephone network. The gateway server communicates with one or more active wall units to extract one or more telephonic and data calls from the analog signal produced from a wall unit, and to appropriately route the telephonic calls over the PSTN and the data packets over the Internet or to other data services. The telephonic and data devices connected to the wall unit are each assigned individual virtual phone numbers by the provider of the service embodying this invention. To reach one of these devices, its respective virtual telephone number is used. The virtual phone numbers are published across the PSTN and therefore can be reached from anywhere on the PSTN. In another embodiment, virtual phone numbers are not required, as phone calls destined for subscribed telephone number are automatically routed through the gateway server.

18 Claims, 9 Drawing Sheets

U.S. PATENT DOCUMENTS

| | | | | |
|---|---|---|---|---|
| 5,761,292 | A | * | 6/1998 | Wagner et al. ............... 379/229 |
| 5,768,350 | A | * | 6/1998 | Venkatakrishnan ...... 379/93.08 |
| 5,940,598 | A | * | 8/1999 | Strauss et al. ............... 709/249 |
| 6,026,098 | A | * | 2/2000 | Kamoi et al. ............... 370/539 |
| 6,084,885 | A | * | 7/2000 | Scott .......................... 370/455 |
| 6,134,235 | A | * | 10/2000 | Goldman et al. ........... 370/352 |
| 6,141,341 | A | * | 10/2000 | Jones et al. ................. 370/352 |
| 6,144,667 | A | * | 11/2000 | Doshi et al. ................ 370/401 |
| 6,181,694 | B1 | * | 1/2001 | Pickett ........................ 370/353 |
| 6,233,234 | B1 | * | 5/2001 | Curry et al. ................ 370/356 |
| 6,263,063 | B1 | * | 7/2001 | Bansal et al. ............... 379/164 |
| 6,269,095 | B1 | * | 7/2001 | Neubauer et al. ........... 370/352 |
| 6,345,047 | B1 | * | 2/2002 | Regnier ...................... 370/352 |
| 6,407,996 | B1 | * | 6/2002 | Witchalls ................... 370/352 |
| 6,414,952 | B2 | * | 7/2002 | Foley .......................... 370/352 |
| 6,430,174 | B1 | * | 8/2002 | Jennings et al. ............ 370/352 |
| 6,430,176 | B1 | * | 8/2002 | Christie, IV ................ 370/355 |
| 6,668,043 | B2 | * | 12/2003 | Hyziak et al. ................ 379/52 |

OTHER PUBLICATIONS

Telecommunication Standardization Sector of ITU, "Packet–Based Multimedia Communications Systems: ITU–T Recommendation H.323", Series H: Audiovisual and Multimedia Systems: Infrastructure of Audiovisual Services—Systems and Terminal Equipment for Audiovisual Services International Telecommunication Union (ITU), ( Jul. 1998).

* cited by examiner

METHOD AND APPARATUS FOR SIMULTANEOUS MULTILINE PHONE AND DATA SERVICES OVER A SINGLE ACCESS FACILITY

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to telecommunications systems, and more particularly to a phone system for providing simultaneous multiline telephone and data calls over a single access facility.

2. Description of the Prior Art

Telephone customers, especially residential customers, are desirous of being able to simultaneously support multiple telephones calls while accessing data services including the Internet World Wide Web. This demand is being driven by the explosive growth of home computers, fax machines, and the need for multiple phone numbers for a single residence. Currently, about one-third of the American households have more than one phone line, and one-half of the American households have personal computers with a significant number of these households accessing the Internet World Wide Web.

As each standard analog phone line offered by telephone companies currently supports the use of a one telephone service at a time (e.g., a voice call, or a data call), customers must have installed multiple telephone lines to simultaneously use multiple calls. For example, two analog lines are needed to simultaneously make a telephone call while using a personal computer to access the Internet; three lines are required for two phone calls and one data call; and four analog telephone lines for two phones calls, one fax call, and one data call. This becomes quite expensive to have several simultaneous calls as the customer must pay for each phone line, usually on a monthly basis.

Another limitation to providing a plurality of phone lines to the vast majority of residences is the limited embedded copper plant of telephone companies. Typically, each phone line is provided over a single twisted copper pair to the residence, with each residence having only one or two twisted pair to the telephone company. Thus, many customers are limited to simultaneously operating one or two telephonic devices. Therefore, customers are desirous of a service which allows the placement of a plurality of calls over a single analog telephone line.

SUMMARY OF THE INVENTION

According to the invention, a method and apparatus are disclosed for providing multiline telephonic and data services over a single access facility. In one embodiment of the present invention, a wall unit is located at a customer premises which terminates a single analog phone line and adaptively multiplexes a plurality of telephonic and data calls over the single analog phone line. A corresponding gateway server (or a plurality of gateway servers), which supports one or a plurality of wall unit calls, is located in the public switched telephone network ("PSTN") (or possibly in a private telephone network). The gateway server communicates with one or more active wall units to extract one or more telephonic and data calls from the analog signal produced from a wall unit, and to appropriately route the telephonic calls over the PSTN and the data packets over the Internet or to other data services.

The wall unit plugs into a standard analog telephone outlet at home, and communicates to the PSTN over an analog phone line over a single twisted pair. The wall unit is powered by standard commercial power with battery backup. The wall unit uses the telephone number of the analog phone line. The telephonic and data devices connected to the wall unit are each assigned individual virtual phone numbers by the provider of the service embodying this invention. To reach one of these devices, its respective virtual telephone number is used. The virtual phone numbers are published across the PSTN and therefore can be reached from anywhere on the PSTN. In this manner, the present invention provides multiple and simultaneous telephone calls and PC Internet access to the World Wide Web, to and from a residence or other customer location.

In a second embodiment, virtual phone numbers are not required. Rather, the provider of a service embodying the present invention "intercepts" incoming calls specifying a subscribing residence's phone number, and routes them through the gateway. When an interchange carrier or alternate service provider offers this service, the modem connection between the residence and service provider is preferably established at all times; and calls initiated from the local telephone company are call-forwarded-on-busy to the gateway server.

The gateway server is the equipment installed at the service provider point of presence. It provides the overall system control functions, and serves as a gateway between the households, Internet world and the public switched telephone network. All calls to/from a wall unit will be processed by a gateway server. Depending on the types of calls, the gateway server will route or connect the call to either the Internet or PSTN. The present invention applies industry standard technology and protocols to solve a long felt, and significant need to provide multiple, simultaneous telephone and/or data calls over a single analog telephone line.

The wall unit and gateway server communicate with each other via a standard modem connection. When an incoming or outgoing call is detected by either a wall unit or a gateway server, a session is established between the originating/destination wall unit and the destination/originating gateway server if a connection is not already pending. The telephone signals are digitized, compressed, packetized, and sent across the connection, with the other side extracting and appropriately processing the incoming signal. In one embodiment, G72x protocol (e.g., G729.1) is used to encode a voice call to between 8 and 16 KBPS. Thus, over a single 56 KBPS analog phone line, three simultaneous voice calls can be accommodated. The data channel is usually assigned a lower priority than the telephonic traffic, and can use all the bandwidth of the analog phone line unused by the telephonic calls.

The present inventions includes a system for providing multiline service, the system comprising: a modem for exchanging communications signals with a communications network and for exchanging an incoming digital signal and an outgoing digital signal with a statistical multiplexor; the statistical multiplexor for exchanging the incoming digital signal and the outgoing digital signal with the modem, for multiplexing a plurality of outgoing encoded signals from a plurality of telephonic devices into the outgoing digital signal, and for demultiplexing the incoming digital signal into a plurality of incoming encoded telephonic call signals; and at least one call processing element coupled to the statistical multiplexor for converting the plurality of incoming encoded telephonic call signals into a plurality of incoming phone signals, and for converting a plurality of outgoing phone signals into the plurality of outgoing encoded telephonic signals.

Moreover, the present invention includes a system for simultaneously providing multiline phone and data service, the system comprising: a modem for exchanging communications signals with a communications network and for exchanging an incoming digital signal and an outgoing digital signal with a statistical multiplexor; the statistical multiplexor for exchanging the incoming digital signal and the outgoing digital signal with the modem, and for multiplexing an outgoing encoded telephonic call signal and an outgoing data signal into the outgoing digital signal, and for demultiplexing the incoming digital signal into an incoming encoded telephonic call signal and an incoming data signal; and a call processing element coupled to the statistical multiplexor for converting the incoming encoded telephonic call signal into an incoming phone signal, and for converting an outgoing phone signal into the outgoing encoded telephonic signal.

The present invention also provides for A system for providing multiline calls, the system comprising: a modem for exchanging customer signals over a telephone line having encoded therein a set of multiline calls, and for communicating incoming and outgoing digital signals with a statistical multiplexor; the statistical multiplexor for exchanging the digital signals with the modem, and for multiplexing at least one outgoing encoded telephonic call signal from a telephone network into the outgoing digital signal, and for demultiplexing the incoming digital signal into at least one incoming encoded telephonic call signal; at least one call processor coupled to the statistical multiplexor for converting the at least one incoming and outgoing encoded telephonic call signals into at least one telephone network call, and for providing the at least one telephone network call to a gateway switch for communicating over the telephone network; and a control coupled to the at least one call processor for controlling the call processor and for exchanging signaling information with the gateway switch.

The present invention includes a computer-readable medium containing computer-executable instructions for performing steps comprising: receiving a voice call setup request from a remote wall unit; initiating a telephone call set-up over the public switched telephone network using Signaling System 7 (SS7) protocols in response to receipt of the wall unit voice call setup request; and connecting a call from the wall unit to the public switched telephone network by sending signaling messages to the wall unit in response to receipt of a SS7 messages from the public switched telephone network indicating the call is completed to a destination specified in the voice call setup message; converting a Voice Over Internet Protocol encoded signal received from the wall unit to a voice signal recognizable by the public switched telephone network; and converting a voice signal incoming from the public switched telephone network into a Voice Over Internet Protocol encoded signal for transmission to the wall unit.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

DETAILED DESCRIPTION OF THE PREFERRED EMBODIMENT

Figure 1:
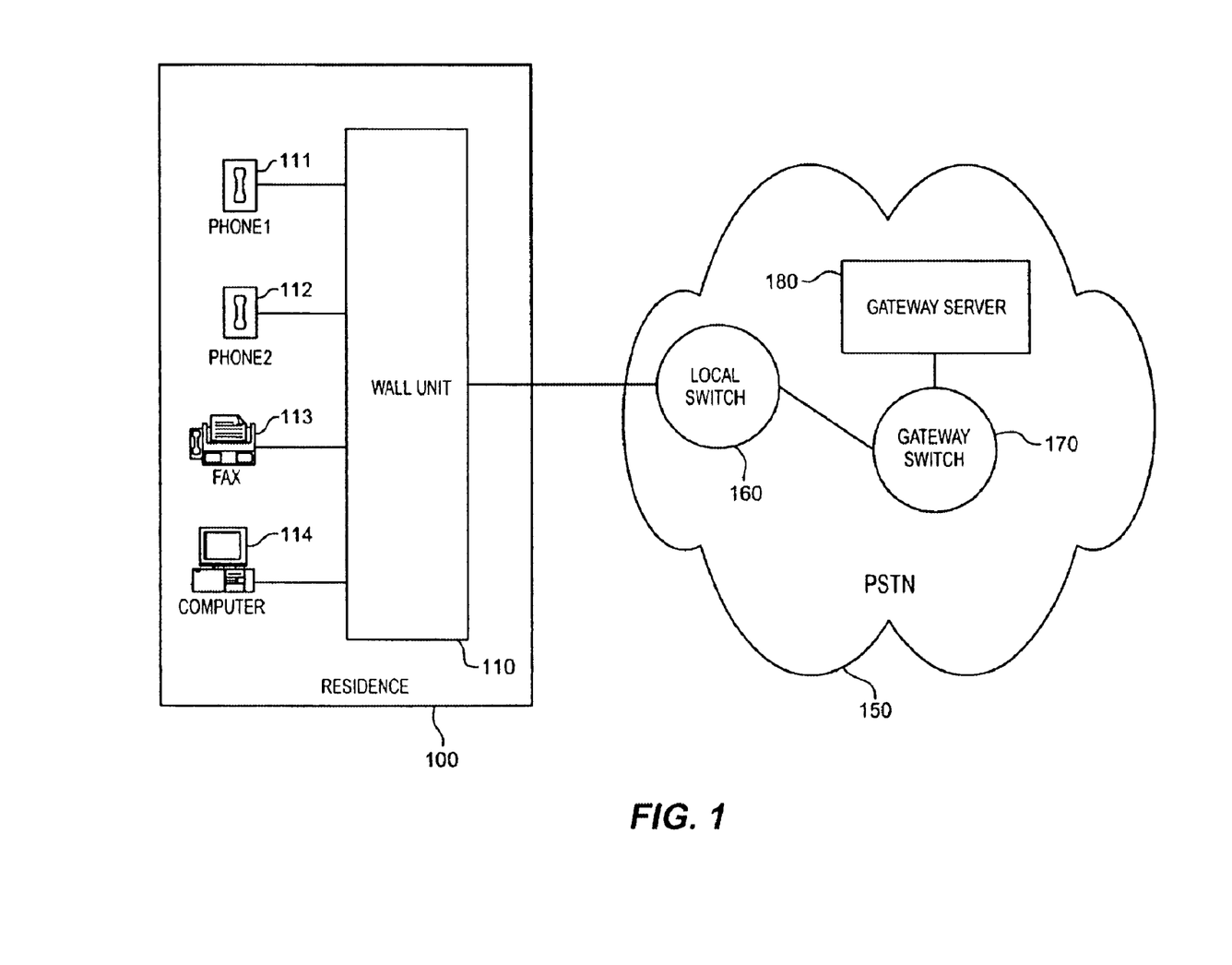
FIG. 1 is a block diagram of an exemplary network environment in which the invention may be implemented.

With reference to FIG. 1, an exemplary network system for implementing the invention includes a customer residence 100 and a public switched telephone network (PSTN) 150. As contemplated by the present invention, this invention could be practiced in any customer location implementing the wall unit functionality and with a public or private network implementing the gateway server functionality as described herein and as would be understood by one skilled in the art.

In one embodiment of the present invention for an interexchange carrier to offer a service comprising the present invention, a residence 100 includes a wall unit 110 for communicating over a single access facility (e.g., a telephone line) with the gateway server 180 of an interchange carrier via a local switch 160 and a gateway switch 170. Alternatively, the gateway server 180 could be connected directly to the local switch 160 for a local exchange carrier provided service comprising the present invention. The wall unit 110 allows multiple customer premises equipment (e.g., phones 111, 112; facsimile machine 113; and computer 114) to simultaneously communicate over a single analog telephone line as described herein. The present invention is not limited four devices connected to the, wall unit 110. Rather, in keeping with the scope and spirit of the present invention, a wall unit supporting additional combinations of the number of analog and digital devices is contemplated, and is a design decision based on market considerations and on current compression and encoding technology as the bandwidth of the telephone line limits the number of simultaneous connections.

Figure 2:
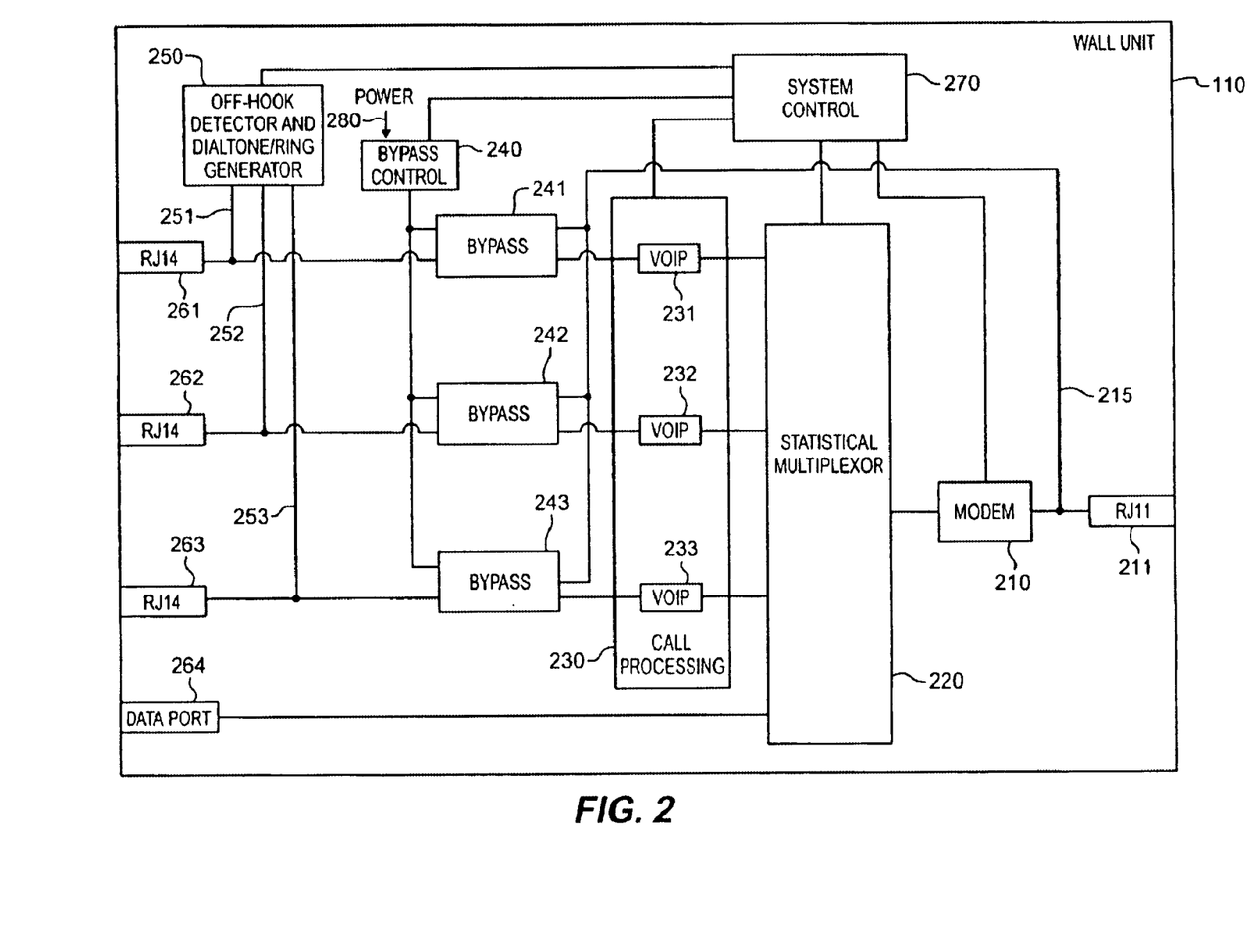
FIG. 2 is a schematic block diagram of one embodiment of the wall unit.

Turning now to FIG. 2, shown is a block schematic of one implementation of the wall unit 110 according to the present invention. The wall unit 110 compresses and encodes the data and voice signals of the connected devices and transmits the compressed and encoded signal to the gateway server 180. Beginning with the customer premises equipment (CPE) side of the wall unit 100 as shown on the left side of FIG. 2, three RJ14 ports 261–263 are provided for connecting to analog telephonic equipment, such as phones 111, 112 and facsimile machine 113 (FIG. 1). In addition, data port 264 is provided for connecting to a digital device, such as computer 114. Telephonic ports 261–263 are electrically connected to bypass elements 241–243 for electrically connecting RJ14 ports 261–263 to line 215 (which carries the incoming analog phone signal) in case of power or other failure of the wall unit 110. In one embodiment, bypass elements 241–243 comprise electromechanical relays. Bypass control 240 controls bypass elements by monitoring the power source 280 for operating the wall unit 110, and optionally connects to the wall unit system control 270 for receiving notification of other errors (e.g., software or control errors).

When the wall unit is functioning properly, the analog telephone devices connected to RJ14 ports 261–263 are electrically connected to call processing unit 230, which compresses and encodes signals of these devices using Voice Over Internet Protocol (VOIP) technology (represented as elements or modules 231–233). These VOIP signals are communicated to/from statistical multiplexor 220 (which is alternatively a router). The output of statistical multiplexor 220 is electrically connected to modem 210 which compresses and encodes the signal to/from statistical multiplexor 220. In addition, data port 264 is electrically connected to statistical multiplexor 220. The analog side of modem 210 is connected to RJ11 port 211 for connecting the wall unit 110 to a standard analog telephone line.

The overall operation of wall unit 110 is controlled by system control 270, which coordinates the activities of the components of the wall unit and communicates signaling information with the gateway server 180. System control 270 typically comprises a computer such as a microprocessor and computer-readable medium or storage (e.g., ROM, RAM, or external storage devices) storing instructions which are computer-executable by the system control 270.

The wall unit 110 further comprises CPE interface circuitry 250 under the control of system control 270. The CPE interface circuitry 250 is connected to the telephonic ports 261–263 by lines 251–253. The CPE interface circuitry 250 provides standard telephone interface functions, including providing D.C. power, detecting on-hook and off-hook conditions, providing ring current, and ring-back and busy tones. The overall operation and control of wall unit 110 is described hereinafter in relation to the flow diagrams illustrated in FIGS. 4A–D.

Figure 3:
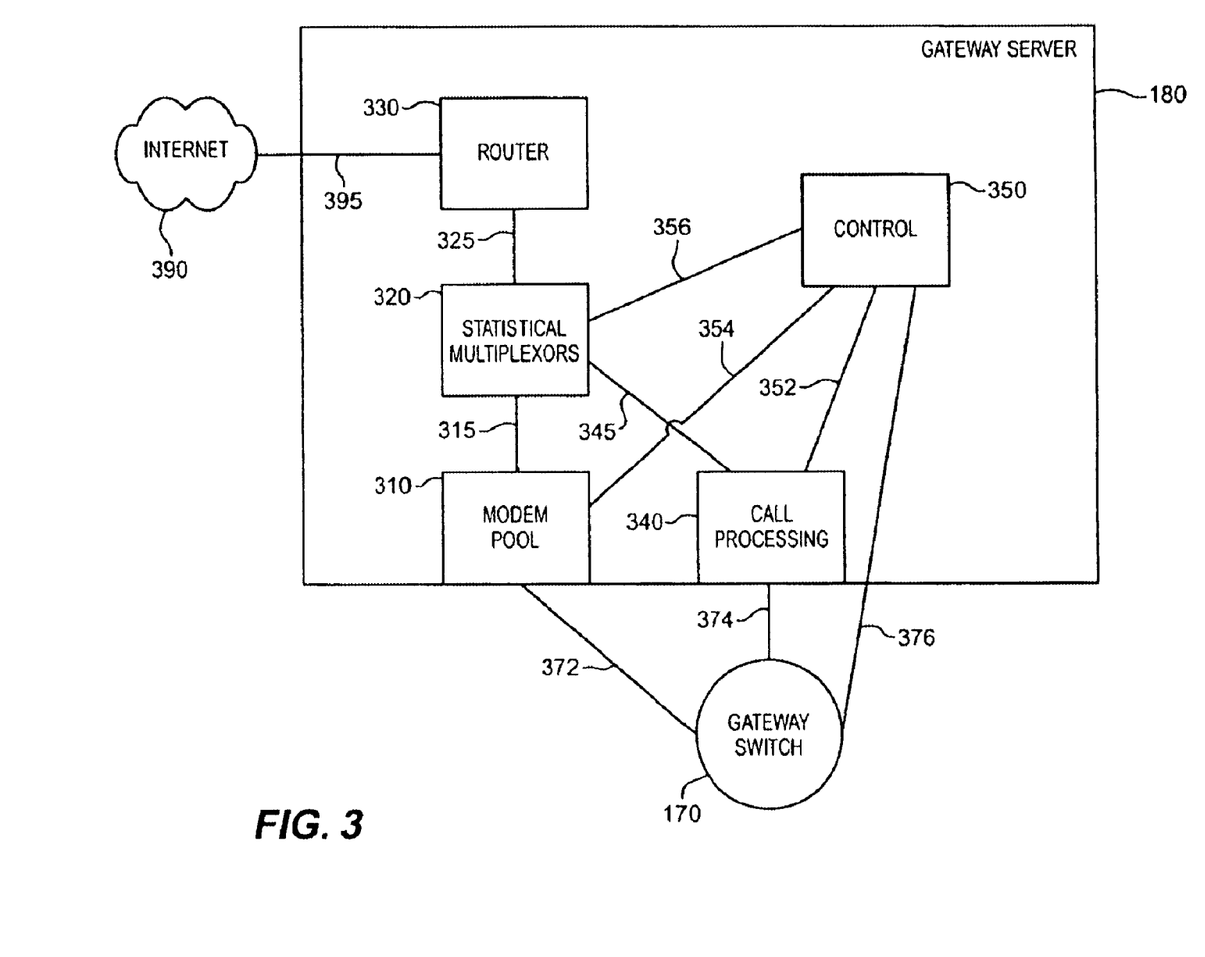
FIG. 3 is a block diagram of one embodiment of the gateway server.

Turning now to FIG. 3, illustrated further is gateway server 180. Gateway server 180 is connected to gateway switch 170 via three sets of lines: PSTN access lines 372 for communication between the gateway server 180 and wall units 110, PSTN access lines 374 for placing and receiving voice calls over the PSTN; and signaling link 376 for communicating signaling information such as call setup, termination and other SS7 messages with the PSTN. Gateway server 1180 is alternatively connected to an SS7 network via another network device. Furthermore, control 350 controls the statistical multiplexor 320 over signal line 356, the modem pool 310 over signal line 354, the call processing unit 340 over signal line 352. Control 350 typically comprises a computer, such as a microprocessor and computer-readable medium or storage (e.g., ROM, RAM, or external storage devices) storing instructions which are computer-executable by the control 350.

Calls from/to the wall units 110 (FIG. 1) are received/initiated by the modem pool 310 under the direction of control 350 via signaling messages over line 354. The resulting digital signal is communicated from the modem pool 310 over line 315 and between statistical multiplexors 320, which then routes voice related signals to call processing unit 340 over line 345 and data calls over line 325 to router 330. Call processing unit 340 manipulates the voice call signals by converting between standard analog telephone signals which are carried across a PSTN network and VOIP encoded signals to/from wall units 110. Router 330 routes incoming and outgoing data packets to the Internet 390 over line 395. Further operation of gateway server 180 is described hereinafter in relation to flow diagrams illustrated in FIGS. 5A–B.

Figure 4A:
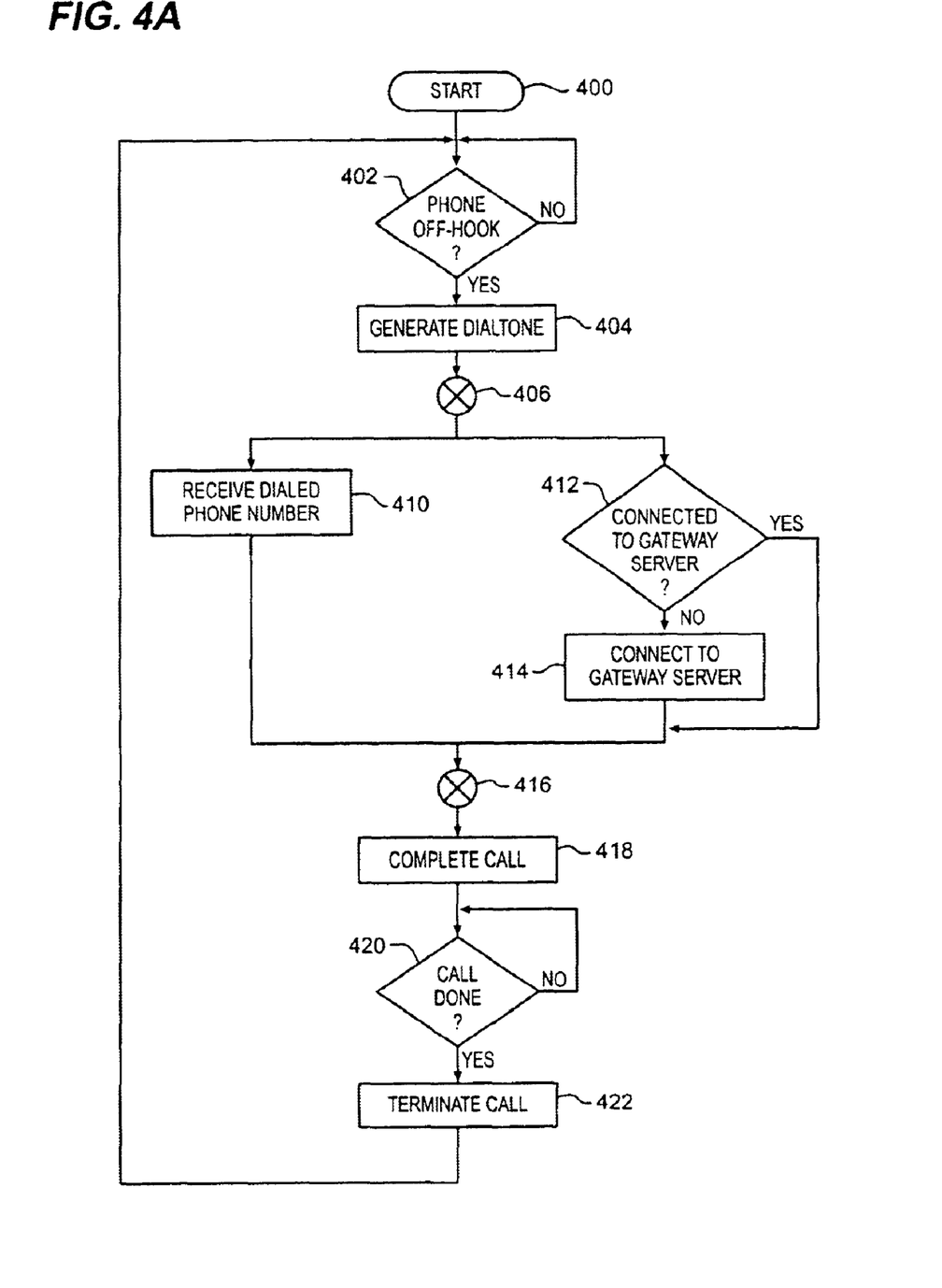
FIGS. 4A–4D are high-level flow diagrams describing the steps performed by the wall unit in placing and receiving phone and data calls.

Turning now to FIGS. 4A–D, shown are flow diagrams for processing by the wall unit 110 for incoming and outgoing phone and data calls. First, FIG. 4A illustrates the processing by the wall unit 110 for initiating a phone call. Processing begins at step 400. Then, processing loops at step 402 until an off-hook condition of ports 261–263 is detected by CPE interface circuitry 250 (FIG. 2). Then processing continues to step 404 where dial tone is generated by CPE interface circuitry 250 on the appropriate line 251, 252 or 253.

Next, processing branches at point 406 to simultaneously (1) establish connection to the gateway server 180 if necessary as determined in steps 412 and 414, and (2) to process step 410 to collect the dialed phone number digits (i.e. DTMF tones) by call processing element 230. Processing of flow diagram 4A joins at point 416, and continues with step 418 where the voice call is completed. To complete the call, call processing element 230 converts the collected phone number to call setup Internet Protocol data packets which conform to the H.323/Q.931 protocol. These data packets are multiplexed by statistical multiplexor 220 with data from other ports 261–263 and sent to gateway server 180. Once the call is established, the VOIP digital signal processor element 231–233 starts the analog to digital conversion and the compression of the voice of the local user using G72x protocol. It is then packetized using the IP protocol and sent to the gateway server 180. The gateway server 180 receives the voice, decompresses it, converts it to an analog signal and puts it on to the PSTN. Simultaneously, the compressed voice data is received by the wall unit 110, is decompressed using the same data path, and is put on the phone line for the user in a full duplex operation. When the telephone call is done as determined in step 420, the call is terminated in step 422, which can include sending and receiving signaling messages with the gateway server 180, and optionally, immediately or after a predetermined time delay of inactivity, the modem connection with the gateway server 180 is terminated if no other voice or data call is in progress.

Figure 4B:
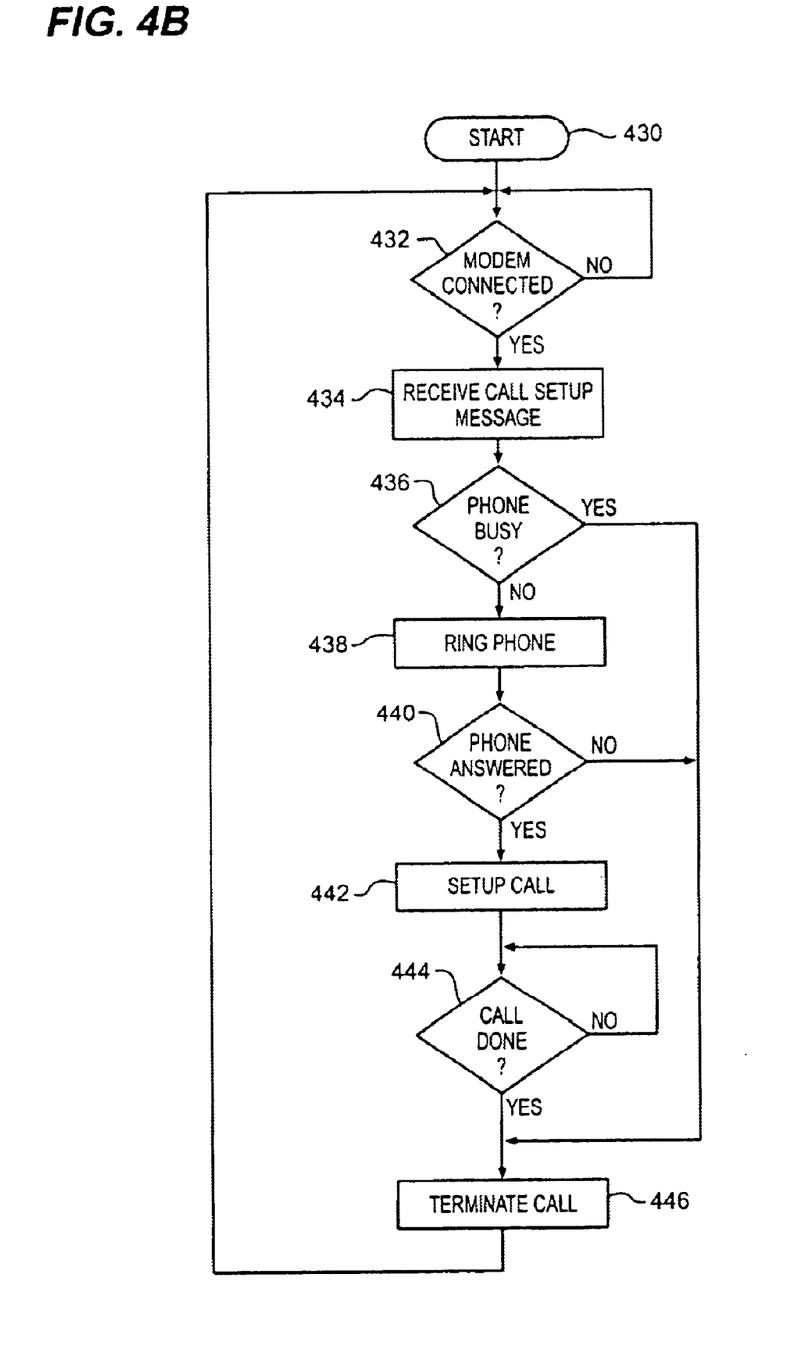

Turning now to FIG. 4B, illustrated are the steps performed by the wall unit 110 in receiving a voice call. Processing begins at step 430, where step 432 is repeated until the modem 210 establishes a call with gateway server 180. Then, in step 434, appropriate call setup codes are received by the wall unit 110 using H323 signaling protocol. Each telephonic port 261–263 is assigned a different virtual phone number. In step 436, if the port corresponding to the incoming telephone call is busy, processing continues at step 446 to terminate the call by sending appropriate signaling messages to the gateway server that the call could not be completed.

Otherwise, in step 438, the CPE interface circuitry 250 generates a ring signal on the appropriate port 261–263. If the phone is answered as determined in step 440, then in step 442 a signaling message is sent to the gateway server 180 by system control 270 and the voice session commences. When the call is completed as determined in step 444 either by a telephonic device going on-hook or the receipt of a call termination message from gateway server 180, then the call is terminated in step 446, which is also the case if the phone is not answered as determined in step 440.

Figure 4C:
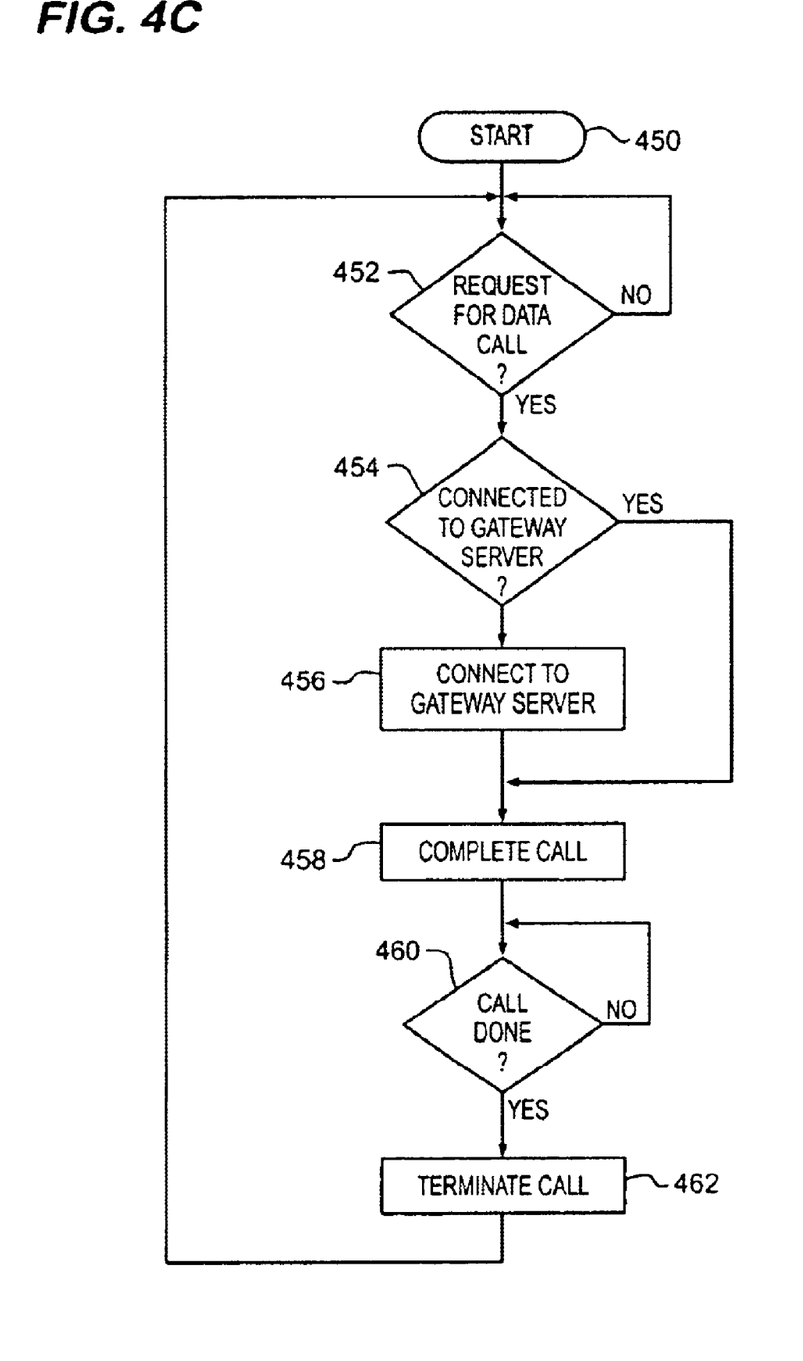

Turning now to FIG. 4C, illustrated are the steps performed by wall unit 110 for a data call originated on data port 264. Processing begins at step 450, where the wall unit 110 waits for a request for data call as indicated by the looping of step 452. Then, step 454 is performed to determine if a session with the gateway server 180 is already established. If not, step 456 is performed to connect to the gateway server. Next, in step 458 the call is completed and the data traffic is routed within the gateway server 180 through router 330 to the Internet 390. When the data call is done as determined in step 460, the call is terminated in step 462.

Figure 4D:
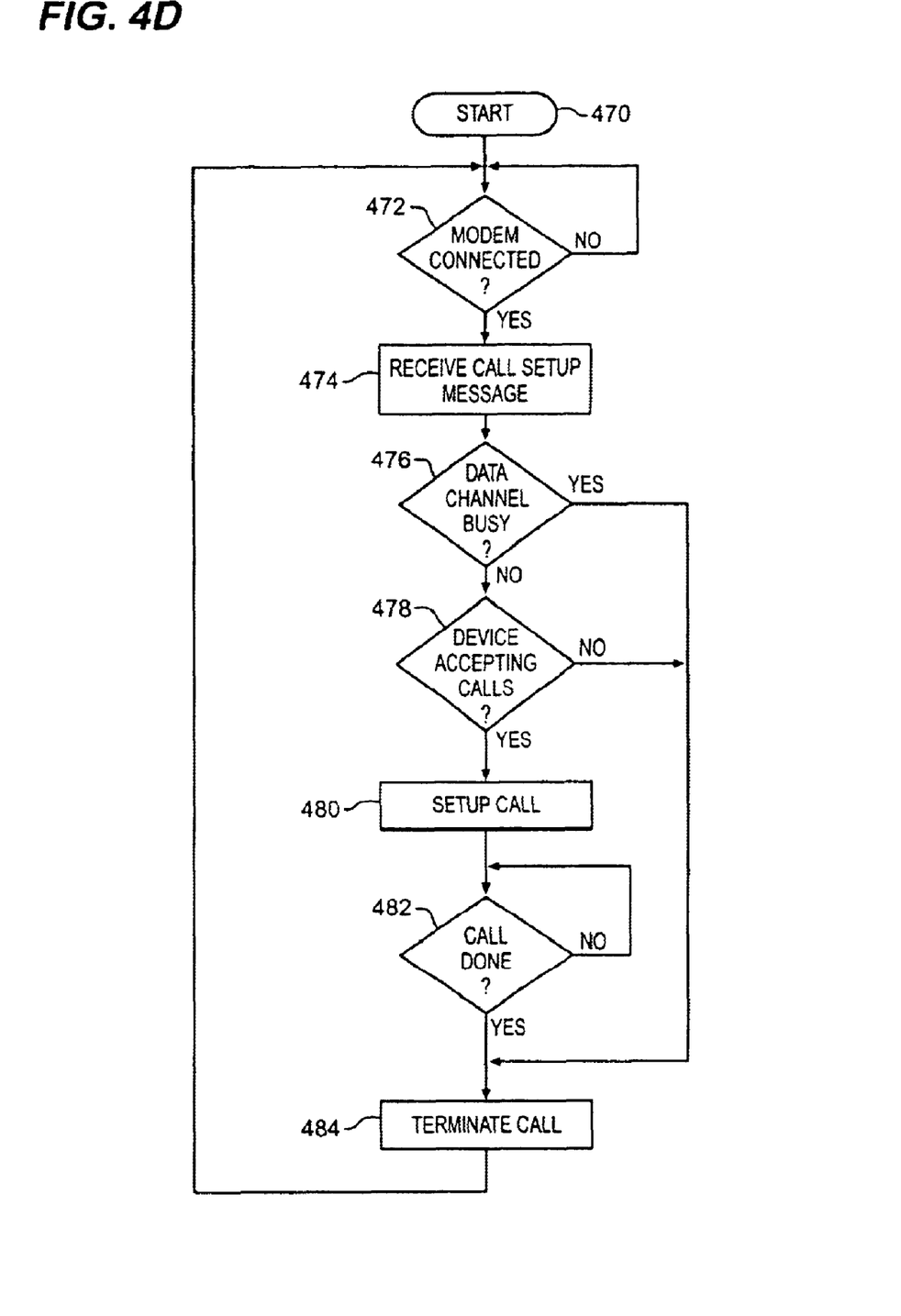

Turning now to FIG. 4D, illustrated are the steps performed by wall unit 110 for receipt of a data call to terminate on data port 264. Processing begins at step 470, where the wall unit 110 waits for a modem connection with the gateway server 180 as indicated by the looping of step 472. After the modem connection is established, step 474 is performed to receive the call setup messages. If data port 264 is not busy and the device attached to port 264 is accepting calls as determined in steps 476 and 478, the call is connected in step 480 which causes the data call to be extracted from the statistical multiplexor 220 and routed to data port 264. When the call is completed (e.g., no data traffic for a predetermined amount of time) as determined in step 482, the call is terminated in step 484.

Figure 5A:
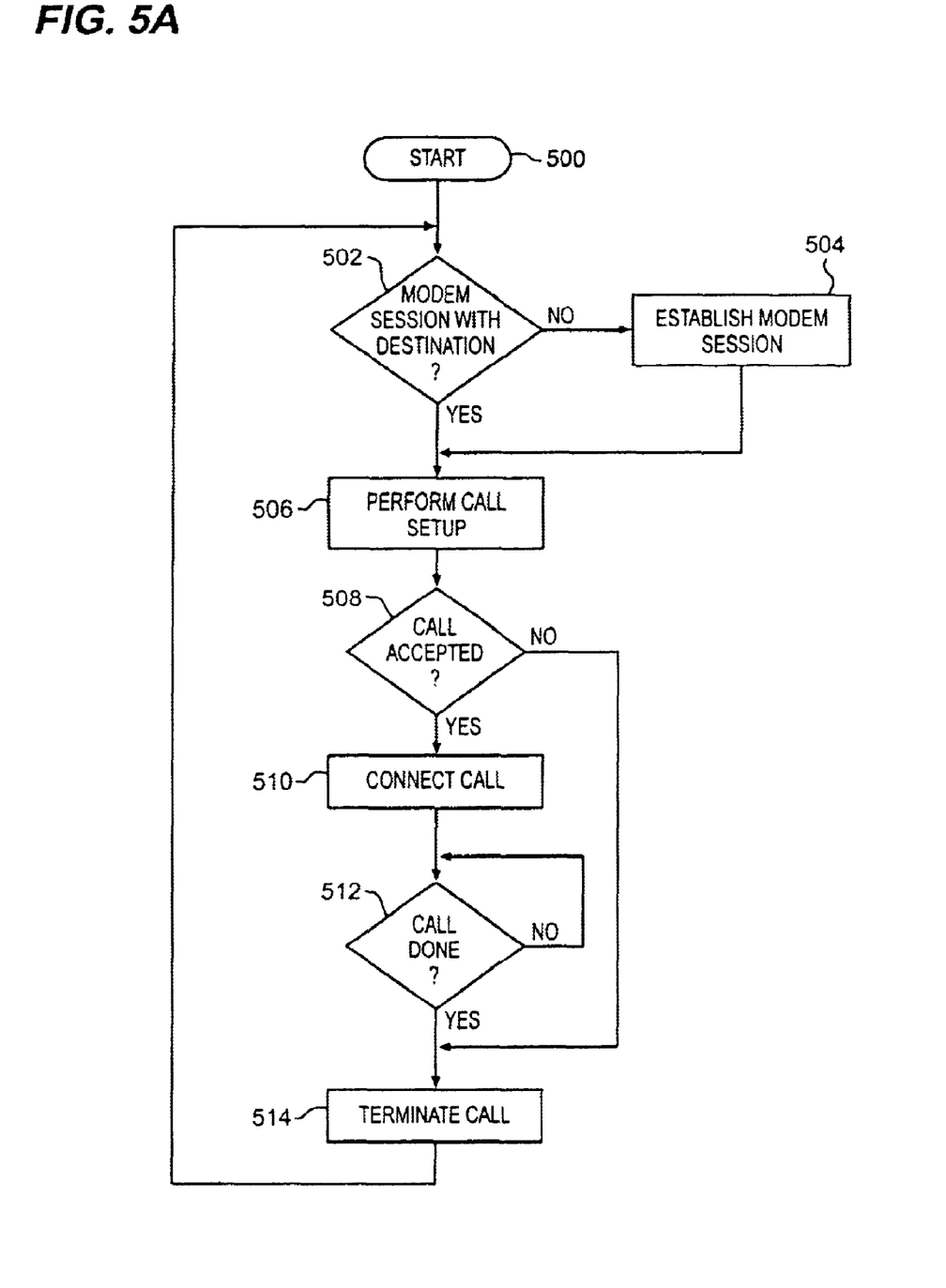
FIGS. 5A–B are high-level flow diagrams describing the steps performed by the gateway server in originating and terminating calls.

Turning now to FIG. 5A, illustrated are the steps performed by the gateway server 180 in originating a call to the wall unit 110. Processing commences with step 500. In step 502, control 350 of the gateway server determines whether there exists a modem session with the appropriate destination. If not, step 504 is performed to establish such a session. Next, step 506 is performed to send signaling information to wall unit 110. In step 508, if a call is established with the customer premises equipment connected to one of the ports 261–264, the call is connected in step 510. When the call is completed as determined in step 512, step 514 is performed to terminate the call.

Figure 5B:
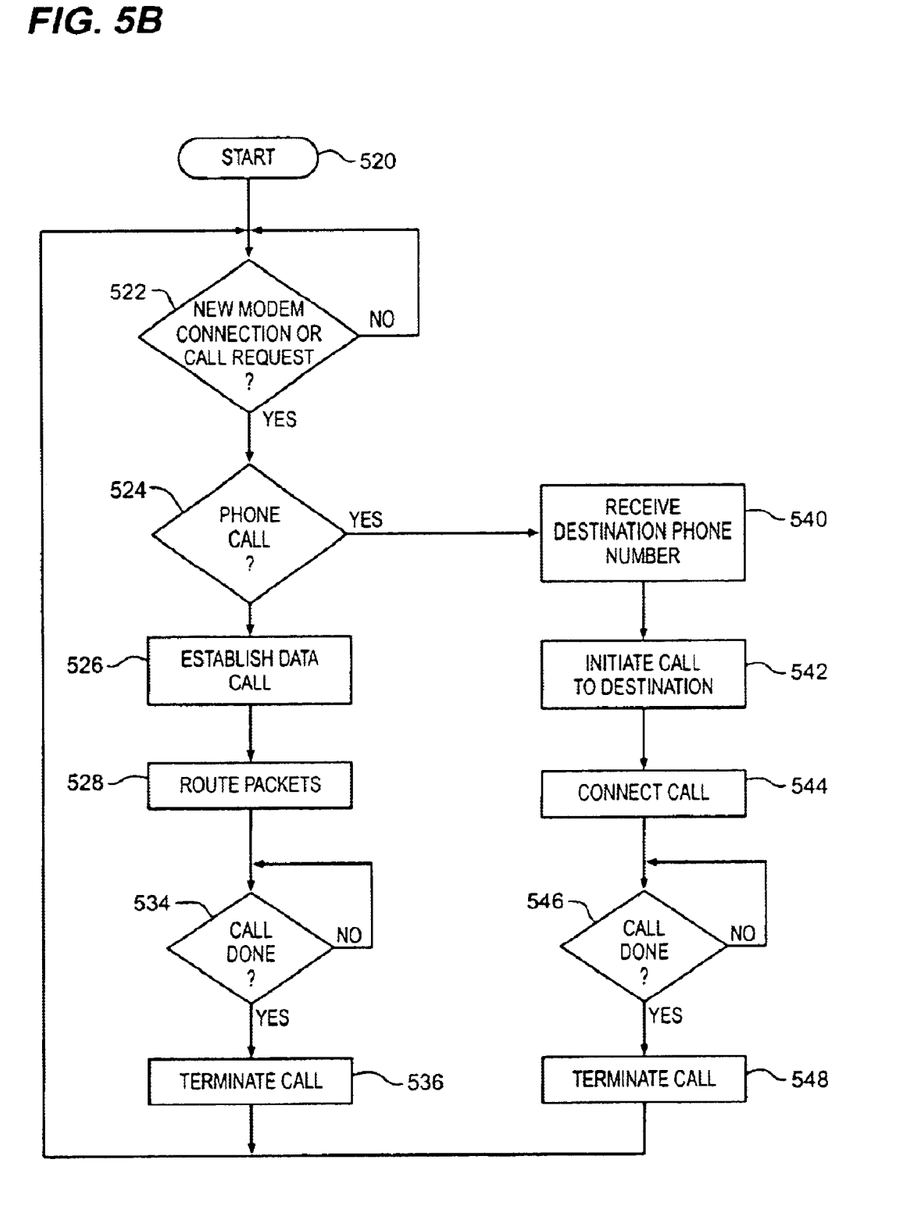

Turning finally to FIG. 5B, illustrated are the steps performed by the gateway server 180 in receiving a call initiated by the wall unit 110. Processing commences with step 520. In step 522, the gateway server 180 waits for either a modem connection or a new call request over and existing modem connect. Next, step 524 determines whether the call is a voice or data call.

For a data call, steps 526–536 are performed. First, in step 526, the data call is established by communicating signaling information with the wall unit 110 and by establishing a logical communications channel between the statistical multiplexor 320 and router 330. Then, at step 528, packets comprising the data call are routed between the wall unit 110 and the Internet 390. When the call is done, as determined in step 534, step 536 is performed to terminate the data call and release the resources.

For a voice call, steps 540–548 are performed. First, in step 540, the destination phone number is received through signaling messages between the wall unit 110 and gateway server 180. In step 542, the gateway server initiates a call over the PSTN to the destination and upon receipt of a call connection message, step 544 is performed to connect the call from the PSTN to the appropriate port of the wall unit 110. When the call is done, as determined in step 546, step 548 is performed to terminate the data call and release the resources.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

We claim:

1. A system for providing multiline service, the system comprising:

a modem for exchanging communications signals with a communications network and for exchanging an incoming digital signal and an outgoing digital signal with a statistical multiplexor;

the statistical multiplexor for exchanging the incoming digital signal and the outgoing digital signal with the modem, for multiplexing a plurality of outgoing encoded telephonic call signals from a plurality of telephonic devices into the outgoing digital signal, and for demultiplexing the incoming digital signal into a plurality of incoming encoded telephonic call signals;

at least one call processing element coupled to the statistical multiplexor for converting the plurality of incoming encoded telephonic call signals into a plurality of incoming phone signals, and for converting a plurality of outgoing phone signals into the plurality of outgoing encoded telephonic call signals;

one or more bypassing elements positioned between the plurality of telephonic devices and the statistical multiplexor and operative to connect the plurality of telephonic devices either to the at least one call processing element or to the communications network;

control circuitry; and customer premises equipment interface circuitry for providing at least one of a group comprising: D.C. power, indications of on-hook and off-hook conditions, ring current, ring-back tones or busy tones; wherein the control circuitry communicates with the at least one call processing element and controls the customer premises equipment interface circuitry.

2. The system of claim 1, wherein the at least one call processing element encodes and decodes using Voice Over Internet protocol.

3. The system of claim 1, wherein the at least one call processing element exchanges signaling information with the communications network.

4. The system of claim 1, further comprising at least one data port coupled to the statistical multiplexor for exchanging a second portion of the encoded telephonic call signals with a data device.

5. A system for simultaneously providing multiline phone and data service, the system comprising:

a modem for exchanging communications signals with a communications network and for exchanging an incoming digital signal and an outgoing digital signal with a statistical multiplexor;

the statistical multiplexor for exchanging the incoming digital signal and the outgoing digital signal with the modem, and for multiplexing an outgoing encoded telephonic call signal and an outgoing data signal into the outgoing digital signal, and for demultiplexing the incoming digital signal into an incoming encoded telephonic call signal and an incoming data signal;

a call processing element coupled to the statistical multiplexor for converting the incoming encoded telephonic call signal into an incoming phone signal, and for converting an outgoing phone signal into the outgoing encoded telephonic call signal;

one or more bypassing elements positioned between a plurality of telephonic devices and the statistical multiplexor and operative to connect the plurality of telephonic devices either to the call processing element or to the communications network control circuitry; and customer premises equipment interface circuitry for providing at least one of a group comprising: D.C. power, indications of on-hook and off-hook conditions, ring current, ring-back tones or busy tones; wherein the control circuitry communicates with the call processing element and controls the customer premises equipment interface circuitry.

6. The system of claim 5, wherein the call processing element encodes and decodes using Voice Over Internet Protocol.

7. The system of claim 5, wherein the call processing element exchanges signaling information with the communications network.

8. The system of claim 5, wherein the incoming and outgoing digital signals are exchanged with a personal computer, and the incoming and outgoing phone signals are exchanged with a telephone or a fax machine.

9. A system for providing multiline calls, the system comprising:

a modem for exchanging customer signals over a telephone line having encoded therein a set of multiline calls, and for communicating incoming and outgoing digital signals with a statistical multiplexor;

the statistical multiplexor for exchanging the digital signals with the modem, and for multiplexing at least one outgoing encoded telephonic call signal from a telephone network into the outgoing digital signal, and for demultiplexing the incoming digital signal into at least one incoming encoded telephonic call signal;

at least one call processor coupled to the statistical multiplexor for converting the at least one incoming and outgoing encoded telephonic call signals into at least one telephone network call, and for providing the at least one telephone network call to a gateway switch for communicating over the telephone network;

a control coupled to the at least one call processor for controlling the call processor and for exchanging signaling information with the gateway switch;

one or more bypassing elements positioned between a plurality of telephonic devices and the statistical multiplexor and operative to connect the plurality of telephonic devices either to the at least one call processing element or to the telephone network;

control circuitry; and customer premises equipment interface circuitry for providing at least one of a group comprising: D.C. power, indications of on-hook and off-hook conditions, ring current, ring-back tones or busy tones; wherein the control circuitry communicates with the at least one call processor and controls the customer premises equipment interface circuitry.

10. The system of claim 9, further comprising a router coupled to the statistical multiplexor for routing packets to an Internet or other data service; and wherein the set of multiline calls includes at least One telephonic and at least one data calls.

11. The system of claim 9, wherein the control also controls the modem and the statistical multiplexor.

12. The system of claim 9, wherein the call processor encodes and decades using Voice Over Internet Protocol.

13. The system of claim 9, wherein the exchanged signaling information uses Signaling System 7 (SS7) protocols.

14. The system of claim 9, wherein the call processor encodes a telephone call signal originated from a remote device connected to a public switched telephone network.

15. A computer-readable medium containing computer-executable instructions for performing steps comprising:

receiving a voice call setup request from a remote wall unit;

initiating a telephone call set-up over a public switched telephone network using Signaling System 7 (SS7) protocols in response to receipt of the wall unit voice call setup request; and connecting a call from the wall unit to the public switched telephone network by sending signaling messages to the wall unit in response to receipt of a SS7 messages from the public switched telephone network indicating the call is completed to B destination specified in the voice call setup message;

converting a Voice Over Internet Protocol encoded signal received from the wall unit to a voice signal recognizable by the public switched telephone network; and converting a voice signal incoming from the public switched telephone network into a Voice Over Internet Protocol encoded signal for transmission to the wall unit.

16. The computer-readable medium of claim 15, comprising further computer-executable instructions for controlling a modem pool a statistical multiplexor, and a call processor.

17. A communication system for providing multiline phone and data service over a single telephone line, the communication system comprising:

a wall unit configured to multiplex one or more residence-located analog and digital electronic devices onto the signal telephone line, with the wall unit comprising:

a modem for exchanging communications signals with a communications network and for exchanging an incoming digital signal and an outgoing digital signal with a statistical multiplexor;

the statistical multiplexor for exchanging the incoming digital signal and the outgoing digital signal with the modem, and for multiplexing an outgoing digital signal, and for demultiplexing the incoming digital signal into an incoming encoded telephonic call signal and an incoming data signal;

a call processing element coupled to the statistical multiplexor for converting the incoming encoded telephonic call signal into an incoming phone signal, and for converting an outgoing phone signal into the outgoing encoding telephonic call signal;

one or more bypassing elements positioned between a plurality of telephonic devices and the statistical multiplexor and operative to connect the plurality of telephonic devices either to the call processing element or to the communications network control circuitry; and customer premises equipment interface circuitry for providing at least one of a group comprising: D.C. power, indications of on-hook and off-hook conditions, ring current, ring-back tones or busy tones; wherein the control circuitry communicates with the call processing element and controls the customer premises equipment interface circuitry;

a gateway server connected to an Internet Protocol (IP) network and in communication with a public switched telephone network (PSTN), with the gateway server being configured to route a voice related signal between the wall unit and the PSTN network and further configured to route a data related signal between the wall unit and the IP network, with the gateway server comprising:

- a modem pool configured to provide an available modem to connect to and communicate with the gateway switch over a first telephone access line and therefore communicate with the wall unit through the PSTN;
- a call processing configured to communicate with the gateway switch over a second telephone access line, convert voice-over-internet-Protocol (VOIP) encoded signals received from the wall unit via the available modem into analog telephone signals to be transmitted over the PSTN, and convert analog telephone signals received from the PSTN network into VOIP encoded signals for transmission to the wall unit;
- a statistical multiplexor in communication with the modem pool and with the call processing and configured to multiplex incoming signals received via the modem pool and the gateway switch to either the IP network or the PSTN network and further configured to multiplex signals received from the IP network and the PSTN network into a single signal to be transmitted to the wall unit through the gateway switch;
- a router in communication with the statistical multiplexor and the IP network and configured to route signals to a destination on the IP network; and
- a control in communication with the statistical multiplexor over a first signal line, the modem pool over a second signal line, the call processing over a third signal line, and the gateway switch over a fourth signal line, with the control configured to transmit and receive signaling information including call setup signals and termination signals; and
- a gateway switch connected to the PSTN network and configured to connect the wall unit to the gateway server.

18. A gateway server that communicates with a wall unit in order to provide multiline phone and data service over a single telephone line, the gateway server comprising:

- a modem pool configured to provide an available modem, with the available modem communicating with a gateway switch of a public switched telephone network (PSTN) over a first telephone access line and therefore communicate with the wall unit through the PSTN;
- a call processing element communicating with the gateway switch over a second telephone access line, convert voice-over-Internet-Protocol (VOIP) encoded signals received from the wall unit via the available modem into analog telephone signals to be transmitted over the PSTN, and convert analog telephone signals received from the PSTN network into VOIP encoded signals for transmission to the wall unit;
- a statistical multiplexor in communication with the modem pool and with the call pressing and configured to multiplex incoming signals received via the modem pool and the gateway switch to either an Internet Protocol (IP) network or the PSTN network and further configured to multiplex signals received from the IP network and the PSTN network into a single signal to be transmitted to the wall unit through the gateway switch;
- a router in communication with the statistical multiplexor and the IP network and configured to route signals to a destination on the IP network; and
- a control in communication with the statistical multiplexor over a rut signal line, the modem pool over a second signal line, the call processing over a third signal line, and configured to communicate with the gateway switch over a fourth signal line, with the control configured to transmit and receive signaling information including call setup signals and termination signals.

* * * * *